Nov. 2, 1965  K. E. DORSCHU  3,215,814
WELDING OF HIGH YIELD STRENGTH STEEL
Filed May 31, 1963  2 Sheets-Sheet 1
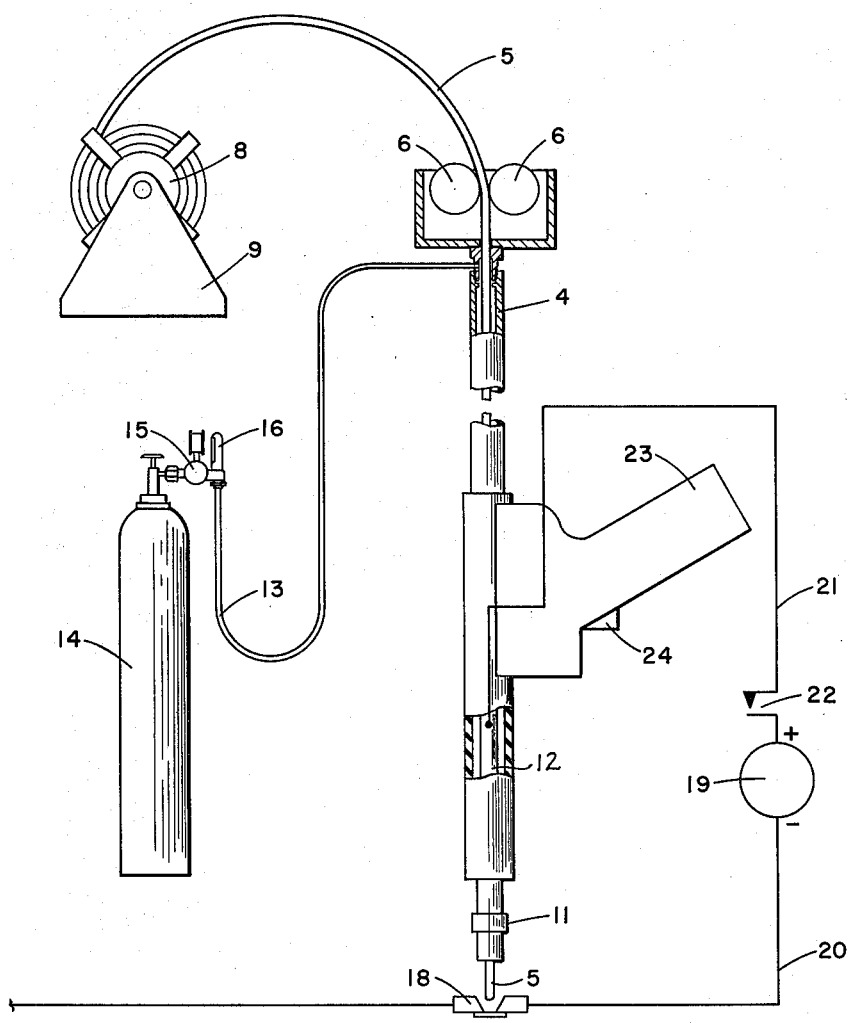
FIG. I
INVENTOR
KARL E. DORSCHU
BY
HIS ATTORNEY

INVENTOR
KARL E. DORSCHU

United States Patent Office 3,215,814
Patented Nov. 2, 1965

3,215,814
WELDING OF HIGH YIELD STRENGTH STEEL
Karl E. Dorschu, Basking Ridge, N.J., assignor to Air Reduction Company, Incorporated, New York, N.Y., a corporation of New York
Filed May 31, 1963, Ser. No. 284,453
6 Claims. (Cl. 219—145)

This invention relates to improvements in welding wire for low alloy steels, particularly for gas-shielded metal arc welding of high yield strength and high impact resistant low alloy steels.

A wire composition suitable as an electrode for welding high yield strength, high impact resistant low alloy steels, and a method for welding with such wire, is disclosed in U.S. Patent No. 2,810,818, issued Oct. 22, 1957, and owned by the assignee hereof. While the welding wire disclosed in the patent provides welds which in the "as-welded" condition have yield strengths and impact resistances of the order of the yield strength and impact resistance of the steels which they were designed to weld, the progress of the art of steel making has more recently provided low alloy steel plate of still greater yield strengths and still higher impact resistances, making necessary the accompanying development of welding wire which will have, in the as-welded condition, yield strength and impact resistance to match the steels already available and to anticipate still further improvements in such steel.

An object of the invention is to increase the yield strength and impact resistance of weld metal joining high yield strength, high impact resistant low alloy steels.

A related object is to improve the yield strength and impact resistance of welds in high yield strength, high impact resistant low alloy steels to a point where the welds are comparable in these properties to the yield strength and impact resistance of the steels they join.

A further related object is to provide a welding method and a welding wire for use in said method that will ensure the desired properties in the weld metal after the metal has been deposited.

According to the present invention, a welding wire composition is provided which is eminently suitable for effecting welds in high yield strength, low alloy steels. The wire composition of the present invention is by percent weight analysis in the general range of approximately 0.05 to 0.11 carbon, 1.40 to 2.36 manganese, 0.29 to 0.49 silicon, 1.56 to 3.00 nickel, 0.12 to 1.61 chromium, 0.38 to 0.60 molybdenum, 0.59 maximum, copper, 0.010 to 0.025 titanium, and balance essentially iron. The residual elements phosphorous and sulfur, are kept low but they can each be present in the amounts achieved by goood steel-making practice, not to exceed .017% by weight. The wire composition contains 90% iron minimum by weight.

By using a composition of the foregoing analysis, the desired results can be achieved without certain disadvantageous requirements and limitations of prior art procedures and practices. More specifically, the present invention avoids any:

(1) Requirement of low carbon content in the wire, specifically any stringent limitation to 0.05% carbon as the maximum.

(2) Necessity of resorting to a vacuum melting procedure in preparing the wire heat.

(3) Requirement to maintain low residual deoxidants.

(4) Restriction to use of the non-consuming electrode inert gas shielded arc welding process.

(5) Necessity of abnormal or unduly costly control of the amount of the phosphorous and sulphur content of the wire.

In the preferred case, the weld metal composition of the present invention is used as consumable electrode wire for inert gas shielded arc welding of steels of the type referred to. Such wire is sold and used as a spooled coil adapted to be fed as bare wire to the welding arc. The preferred process by which the wire is deposited is the inert gas shielded consumable electrode process employing reverse polarity and inert shielding gases as disclosed in Muller et al. U.S. Patent No. 2,504,868 granted Apr. 18, 1950, and owned by the assignee hereof. Other satisfactory processes include inert gas shielded straight or reverse polarity consumable electrode processes using emissive additives as disclosed in Muller U.S. Patent No. 2,694,763, and an analogous process using alternating current and emissive additives as disclosed in Muller U.S. Patent No. 2,694,764. Additional forms of shielding gases which are preferred for consumable electrode arc welding with the present wire are disclosed in co-pending Sohn and Robinson patent applications, U.S. Serial No. 204,722, now Patent 3,143,631 and No. 637,977, now Patent 3,143,- 630 filed Jan. 6, 1959 and Feb. 4, 1957, respectively, and disclosing the addition of a minor quantity of oxygen or a minor quantity of carbon dioxide respectively to the inert gas shield, usually argon.

The filler wire of the present invention may be deposited by processes other than the foregoing ones, which are primarily inert gas shielded processes in which the metal is transferred by a spray type arc within an inert gas shield to the workpiece. That is to say, the present wire may also be deposited by a non-consuming electrode inert gas shielded arc process, by a submerged arc welding process, or by the dip transfer process of U.S. Patent No. 2,886,696, owned by the assignee hereof.

In some applications, other shielding gas mixtures produce satisfactory results, examples being a mixture of argon and helium with or without small additions of oxygen, and a mixture of argon, helium, with minor additions of carbon dioxide.

The welding wire of the present invention can be deposited upon, or used to weld a base metal of substantially the same composition as the welding wire. It will be understood of course that the base plates or base metal can be of other compositions so long as they are compatible with the composition of the present welding wire. Preferably these base plates are of a ferrous low alloy composition exhibiting high strength and high toughness whereby the full utility of my new wire will be realized because of the overall strength and toughness of the entire resulting weldment.

Other objects, features, and advantages of the invention will be apparent from the following more detailed description of illustrative embodiments of the invention, considered in conjunction with the accompanying drawings which form a part hereof and in which:

FIGURE 1 is a view, partially schematic, showing an inert gas shielded arc welding apparatus for carrying out the preferred welding process utilizing the electrode wire of the present invention;

Figure 3:
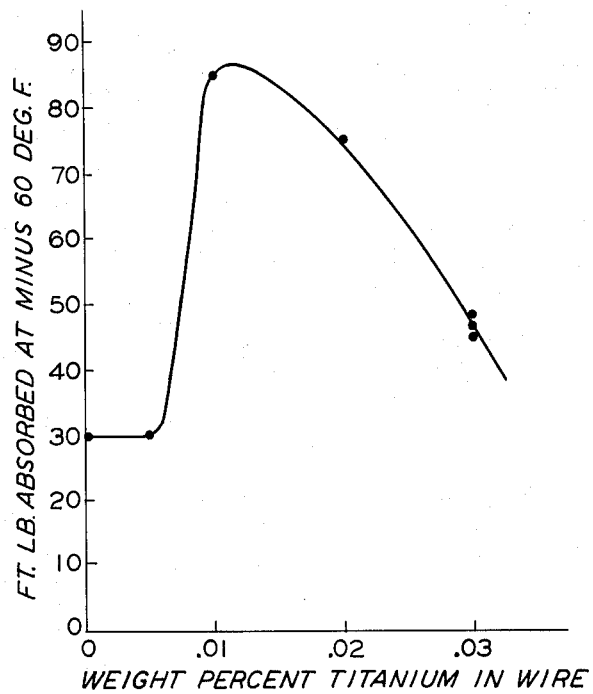
FIGURE 3 is a graph showing experimental data relating impact resistance of weld metal to residual titanium content in the welding wire.

FIGURE 1 of the drawings shows one form of apparatus for carrying out the preferred process for welding with the present wire, wherein a bare wire electrode 5 of the composition herein disclosed is withdrawn from a reel 8 supported in a bracket 9, the wire being fed by a pair of motor driven feed rolls 6. The feed rolls 6 feed the wire electrode through a cable or conduit 4 of fixed length interconnecting the wire feed mechanism and a welding gun 11. A gas cylinder 14 supplies through a gas line a shielding gas or mixture of shielding gases for shielding the arc, the gas line including a pressure reducing valve 15, a flow meter 16, and a tube 13 leading to the conduit 4. The gas flows through the conduit 4 in a space between the casing of the conduit and the wire electrode 5.

A welding current source 19 has one electrical terminal connected by a conductor 20 to the parts of a metal workpiece 18, and a conductor 21 leads from the other terminal of the source 19 to a conventional current pickup shoe 12 of the welding gun 11, which makes electrical contact with the end of the wire electrode 5. A line switch 22 is shown connected in series with the conductor 21.

The welding current source 19 is preferably a direct current welding power supply. The negative terminal of the power supply is connected to the workpiece and the positive terminal is connected to the wire electrode 5, thus providing what is characterized as reverse polarity for the welding arc, not shown.

With the apparatus connected and arranged as just described, it will be understood that when the operator grasps the handle 23 provided on the welding gun 11, he operates a trigger-type pressure switch 24 which, through suitable conventional control circuits, impresses the voltage of the welding current source 19 across the electrode 5 and the metal workpiece 18 through lead 20, the line switch 22, and the lead 21. Simultaneously, from operation of a solenoid control valve, not shown, in the gas supply line, the line is opened and shielding gas flows from the tank 14 through the tube 13 and conduit 4 into the welding gun 11. The gas emerges from the welding gun 11 as a protective shield of gas excluding air from the region between the end of the electrode 5 and the workpiece, as soon as these elements are brought into close proximity to one another.

An arc is drawn and a normal welding voltage is established between the electrode and the workpiece 18. The rolls 6 drive the wire electrode 5 at a constant rate of speed to feed the electrode wire toward the arc and thus maintain the arc as metal is transferred from the electrode to the base metal or weld pool on the workpiece. The inert shielding gas serves not only to provide desirable arc characteristics but also serves to protect the hot weld metal, including molten electrode metal transferring across the arc, from contact with or contamination by the ambient arc. Any losses of alloying ingredients between the electrode and the weld bead, through oxidation or otherwise, are therefore eliminated or kept very small.

Figure 2:
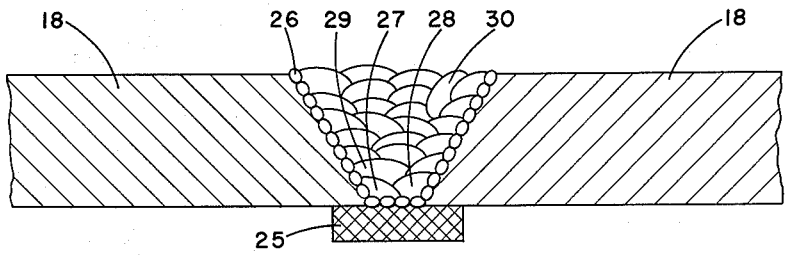
FIGURE 2 is a cross-sectional view to enlarged scale of the workpiece appearing in the lower portion of FIGURE 1.

In FIGURE 2 of the drawings, the workpiece, generally indicated at 18 and consisting of two base plates to be joined, is provided with a backup strip 25 and defines therewith a generally outwardly open V-groove of which the bottom is closed by the strip 25. After the completed weldment juncture is formed, the strip 25 is removed.

In the welding procedure, a low dilution weld metal layer 26 can be applied if desired (for example for test purposes) to the base metal forming the opposed sides of the V-groove and further applied across the closed bottom defined by the strip 25. Then by movement of the gun 11 of the preceding FIGURE 1 in a longitudinal direction (i.e. out of the plane of the paper of FIGURE 2) a series of separate beads 27, 28, 29, etc. is laid down by successive passes so as to fill the V-groove with weld metal from electrode 5 up to a general level 30 projecting slightly concavely outwardly from the plane of the adjacent surface of the workpiece 18.

For the purpose of evaluating the physical properties of test specimens of the deposited filler metal from electrode wire 5, suitable tensile test specimens and suitable standard Charpy-V-notch specimens can be removed from the central part of the weld and destructively tested for yield strength, and also for toughness characteristics measured in terms of foot pounds of energy absorbed in a pendulum-type Charpy test fixture.

In accordance with the invention, the welding wire is a steel alloy which in its specific aspects has the composition set forth. In its generic aspects, however, the weld wire composition by percent weight analysis contains from 0.010 to 0.025 titanium and a minimum of 1.40 manganese, together with nickel, chromium, molybdenum, silicon and carbon in proper balance to obtain the desired high yield strength and toughness. Residual copper, phosphorous and sulphur appear in the analysis, and in some cases copper is added.

In the preferred range, the wire composition by percent weight analysis consists essentially of 0.05 to 0.11 carbon, 1.40 to 2.36 manganese, 0.29 to 0.49 silicon, 1.56 to 3.00 nickel, 0.12 to 1.61 chromium, 0.38 to 0.60 molybdenum; from less than 0.01 to 0.59 copper, 0.003 to 0.017 phosphorous, 0.001 to 0.017 sulphur, and 0.010 to 0.025 titanium, the remainder being essentially iron.

In the as-welded condition, a weld made with wire of the present composition is found to have a yield strength at 0.2 percent offset of 116.1 to 146.5 kips per square inch (116,110 to 146,500 pounds per square inch) as measured using standard 0.505 inch diameter round specimens. Impact data have been obtained using standard Charpy-V-notch specimens with the notch running perpendicular to the plate surface and centered in the weld metal. Resistance to impact is shown in these weld metals by their ability to absorb greater than 20 foot-pounds of energy at temperatures from minus 90 degrees Fahrenheit to below minus 180 degrees Fahrenheit depending upon the particular composition. They also, of course, absorb more than 20 foot-pounds at minus 60 degrees Fahrenheit and the number of foot-pounds measured at minus 60 degrees Fahrenheit has been found to range from 28 to 129.

The Charpy-V-notch test readings in the foot-pound units indicated are performed in accordance with the standard procedure prescribed by the American Society for Testing Materials. More specifically the specimens bear ASTM designation E23–60 and a description appears in the book ASTM Standards 1961, part 3, particularly the type A specimen appearing in FIGURE 3 on page 85.

It is understood that the composition of weld metal deposited as above from the present wire, even if undiluted by the base metal being welded, will nevertheless vary somewhat from the analysis of the wire itself. The variance is due to some loss in the oxidizable elements such that, compared to the wire, the weld metal deposited therefrom (in a 99% argon—1% oxygen arc atmosphere) generally contains about 0.05% to 0.20% less silicon by weight, 0.15% to 0.30% less manganese by weight, 0.01% to 0.04% less carbon by weight, 0.008% to 0.020% less titanium by weight, the other constituents retaining about their same quantities by weight as in the wire. The lost portion of the oxidizable elements disappears as slag or gas, or both, and the percentage losses will obviously increase with increases in the oxidizing component of the inert shielding gas employed during welding.

Thus, referring to the specific composition first mentioned above, a welding wire of this composition will form weld metal by percent weight analysis in the general range of about 0.04 to 0.07 carbon, 1.27 to 2.06 manganese, 0.24 to 0.29 silicon, 1.56 to 3.00 nickel, 0.12 to 1.61 chromium, 0.38 to 0.60 molybdenum, up to 0.59 copper, and 0.002 to 0.005 titanium, the balance being essentially iron but containing residual elements such as phosphorous and sulphur as previously specified. This weld metal will have the high-yield strength and high-impact resistance specified above and therefore will be suitable for the welding of high-yield strength, high-impact resistant low alloy steels, including compatible steels having generally high yield strength and high-impact resistance characteristics of the same order of magnitude as the weld metal.

As previously specified, the weld wire of the invention can be produced by conventional melt techniques.

Thus, in making the wire, the alloy is prepared in the usual way to obtain the desired proportions of the major alloying elements, melting being effected in air or gas atmosphere; vacuum melting, vacuum pouring and vacuum degassing being unnecessary. Immediately before pouring the heat, ferro-titanium alloy or metallic titanium is added by thrusting the titanium additive below the surface of the melt. The proportion of titanium additive used is a definite departure from prior practice in weld-wire manufacture where 1.8 pounds per ton of melt (corresponding approximately to 0.03 percent titanium left in the melt and subsequently in the wire) were sometimes used, for example, for purposes of obtaining satisfactory properties after stress-relief annealing following welding. When the ferro-titanium alloy or metallic titanium has been added, the heat is poured and solidified in the usual manner to form ingots from which wire is produced by hot rolling, followed by wire drawing in known manner. The application of 1 to 1.5 pounds per ton of titanium additive in the above described manner has been found to result in a residual titanium content of 0.010 to 0.025 percent by weight in the finished welding wire. This optimum range of titanium content was determined by making additions of ferro-titanium and metallic titanium in varying amounts to a melt whose base composition was the same as alloy No. 1427 listed below in Table 2. The results can be seen clearly by referring to FIGURE 3 of the drawing which shows a plot of foot pounds absorbed by the resultant weld metal (in the conventional Charpy-V-notch test) at minus 60 degrees F. as a function of total titanium by weight percent analysis in the No. 1427 alloy wire. As indicated in the figure, the intentional addition of titanium to the melt to yield 0.010 to 0.025 weight percent titanium in the wire greatly improves the weld metal toughness.

Within the preferred range of compositions stated above, a preferred sub-range has been found as follows: 0.07 to 0.11 carbon, 1.80 to 2.36 manganese, 0.29 to 0.45 silicon, 1.56 to 3.00 nickel, 0.33 to 1.61 chromium, 0.38 to 0.60 molybdenum, from less than 0.01 to 0.59 copper, 0.003 to 0.017 phosphorous, 0.001 to 0.013 sulphur, and 0.010 to 0.025, titanium, the remainder being essentially iron.

Specific compositions that have been found most satisfactory are given in the following Tables 1, 2 and 3. Each alloy listed also contains .010 to .025 percent titanium by weight and this element is, therefore, not specifically tabulated in the table. The balance of each alloy is essentially iron so as to total 100% by weight in each case.

*Table 1*

| Alloy Number | C | Mn | Si | Ni | Cr | Mo | Cu | P | S |
|---|---|---|---|---|---|---|---|---|---|
| 1635-5 | 0.11 | 1.93 | 0.38 | 2.57 | 0.36 | 0.55 | 0.08 | 0.007 | 0.005 |
| 163-16 | 0.077 | 1.91 | 0.35 | 1.56 | 0.90 | 0.52 | 0.01 | 0.012 | 0.005 |
| 1453 | 0.08 | 2.19 | 0.45 | 2.04 | 0.88 | 0.53 | 0.01 | 0.017 | 0.010 |
| 1465 | 0.08 | 1.92 | 0.41 | 2.10 | 0.86 | 0.56 | 0.09 | 0.010 | 0.013 |

Alloy Number 163-5 has a yield strength of 130 kips per square inch and exhibits toughness sufficient to absorb impact energies greater than 20 foot-pounds down to a temperature below minus 150 degrees Fahrenheit.

Alloy Number 163-16 has a yield strength of 134 kips per square inch and absorbs impact energies greater than 20 foot-pounds down to below minus 180 degrees.

Alloy Number 1453 has a yield strength of 146.5 kips per square inch and absorbs impact energies greater than 20 foot-pounds down to minus 90 degrees.

Alloy Number 1465 has a yield strength of 146 kips per square inch and absorbs impact energies greater than 20 foot-pounds down to minus 96 degrees.

Other compositions that have been found satisfactory are given in Tables 2 and 3. Again, each composition listed contains 0.010 to 0.025 percent titanium by weight, and the balance is essentially iron.

*Table 2*

| Alloy Number | C | Mn | Si | Ni | Cr | Mo | Cu | P | S |
|---|---|---|---|---|---|---|---|---|---|
| 1437 | 0.084 | 1.42 | 0.40 | 1.99 | 0.48 | 0.40 | 0.53 | 0.014 | 0.015 |
| 1398 | 0.081 | 1.49 | 0.46 | 1.88 | 0.63 | 0.42 | 0.14 | 0.015 | 0.015 |
| 1427 | 0.084 | 1.49 | 0.44 | 2.94 | 0.12 | 0.39 | 0.12 | 0.013 | 0.017 |
| 163-10 | 0.05 | 2.35 | 0.39 | 2.04 | 0.94 | 0.54 | 0.01 | 0.006 | 0.006 |
| 1407 | 0.095 | 1.43 | 0.47 | 2.03 | 0.61 | 0.42 | 0.14 | 0.014 | 0.015 |
| 163-19 | 0.079 | 1.91 | 0.29 | 2.03 | 0.59 | 0.57 | 0.01 | 0.003 | 0.006 |

*Table 3*

| Alloy Number | C | Mn | Si | Ni | Cr | Mo | Cu | P | S |
|---|---|---|---|---|---|---|---|---|---|
| 163-3 | 0.072 | 1.91 | 0.42 | 2.04 | 0.55 | 0.60 | 0.59 | 0.003 | 0.001 |
| 163-17 | 0.070 | 2.36 | 0.36 | 2.07 | 0.45 | 0.53 | 0.014 | 0.007 | 0.005 |
| 1443 | 0.08 | 1.80 | 0.37 | 3.00 | 0.33 | 0.38 | 0.012 | 0.010 | 0.010 |
| 163-7 | 0.077 | 1.89 | 0.41 | 1.58 | 1.61 | 0.52 | 0.08 | 0.007 | 0.004 |
| 163-8 | 0.091 | 1.92 | 0.29 | 1.75 | 1.23 | 0.55 | 0.01 | 0.004 | 0.007 |

The alloys listed in Table 2, while showing yield strengths lower than the rest, have yield strengths in the range from 116 to 127 kips per square inch and are useful in many applications. Outstanding among the alloys listed in Table 2 are Numbers 1398, 1427 and 163-19. The alloys listed in Tables 1 and 3 show yield strengths in the range from 136 to 145 kips per square inch. Numbers 1437 and 163-3 contain added copper. In the others, copper is a residual element. In common, the alloys of the foregoing tables exhibited a yield strength in excess of 110,000 p.s.i. and a V-notch Charpy toughness level of greater than 20 foot pounds at −60° F.

The yield strengths attained by weld metals made in accordance with the invention are thus seen to greatly exceed the minimum value of 80 kips per square inch shown by the low alloy steel known as HY-80 and the weld metals are, in fact, stronger and tougher than the low alloy steel weld metals of the prior art. There is achieved therefore by this invention a welding wire suitable for use as a consumable electrode which will take care of the higher yield strength low alloy steels which are now in the research stage, as well as the recently developed low alloy steels of higher yield strength than HY-80, for example existing quenched and tempered steels such as T-1, etc. By T-1 steel I refer to one of the special categories of T-steels, which are a U.S. Steel Corporation ferrous plate material of excellent mechanical properties that are obtained through a critical balance of small amounts of alloying elements in the iron (manganese, nickel, chromium, molybdenum, and boron), and by hot rolling followed by a quench-and-temper heat treatment.

The above described properties of the welds made with welding wires having the compositions described herein can be obtained, as above indicated, when made according to said Patent No. 2,504,868. The patent discloses the basic inert-gas-shielded, metal arc welding method which, combined with the use of the herein disclosed wire compositions, gives as-welded resulting metal compositions having the desired chemical and physical properties. The welding conditions preferred for the wire composition of the present invention include the use of a spray type arc with reverse-polarity direct current, a 99% argon—1% oxygen non-turbulent inert gas shield, and a wire feed rate in excess of 100 inches per minute.

With the instant invention, a weld is achieved with a high rate of deposition, which can be used as welded without heat treatment, and which has a high yield strength and a high level of toughness, and which is not subject to cracking.

Typical welding conditions for welding one and one-half inch ordnance armor plate with the present wire were as follows:

Electrode diameter: 1/16 inch
Gas: 99% argon—1% oxygen at 40 cubic feet per hour
Power: reverse polarity direct current
Current: about 340 amperes
Arc voltages: 26–30 volts
Travel speed per pass: 9–12 inches per minute
Wire feed rate: 180–350 inches per minute While preferred embodiments of the invention have been described, it will be apparent that changes may be made without departing from the spirit and scope of the invention as set forth in the following claims.

What is claimed is:

1. A bare consumable electrode for arc welding in argon arc atmospheres containing oxygen in an amount sufficient to stabilize the arc without oxidizing the weld, said electrode comprising a low alloy ferrous wire composed by percent weight analysis of 0.05 to 0.11 carbon, 1.40 to 2.36 manganese, 0.29 to 0.49 silicon, 1.56 to 3.00 nickel, 0.12 to 1.61 chromium, 0.38 to 0.60 molybdenum, up to 0.59 copper, and 0.010 to 0.025 titanium, the balance being essentially iron.

2. A welding wire for the consumable electrode inert gas shielded arc welding of low alloy steels of high yield strength and high impact resistance, the wire by percent weight analysis consisting essentially of 0.07 to 0.11 carbon, 1.80 to 2.36 manganese, 0.29 to 0.45 silicon, 1.56 to 3.00 nickel, 0.33 to 1.61 chromium, 0.38 to 0.60 molybdenum; 0.59, maximum, copper, a minimum of residual phosphorous and sulphur, and 0.010 to 0.025 titanium, the remainder being essentially iron.

3. A welding wire by percent weight analysis consisting essentially of 0.084 carbon, 1.42 manganese, 0.40 silicon, 1.99 nickel, 0.48 chromium, 0.40 molybdenum, 0.53 copper, a minimum of residual phosphorous and sulphur; and 0.010 to 0.025 titanium, the remainder being essentially iron.

4. A welding wire by percent weight analysis consisting essentially of 0.08 carbon, 2.19 manganese, 0.45 silicon, 2.04 nickel, 0.88 chromium, 0.53 molybdenum; a minimum of residual copper, phosphorous and sulphur, and 0.010 to 0.025 titanium, the remainder being essentially iron.

5. A ferrous alloy arc welding electrode which by percent weight analysis consists essentially of 0.05 to 0.11 carbon, 1.40 to 2.36 manganese, 0.29 to 0.49 silicon, 1.56 to 3.00 nickel, 0.12 to 1.61 chromium, 0.38 to 0.60 molybdenum, up to 0.59 copper, 0.010 to 0.025 titanium, and a minimum of residual phosphorous and sulphur, the remainder being essentially iron.

6. A welded joint comprising a weld bead of arc-deposited low alloy ferrous weld metal having a yield strength in excess of 130,000 p.s.i., and a V-notch Charpy toughness level in excess of 20 foot-pounds at minus 60° F. which by percent weight analysis consists essentially of 0.04 to 0.10 carbon, 1.25 to 2.21 manganese, 0.24 to 0.44 silicon, 1.56 to 3.00 nickel, 0.12 to 1.61 chromium, 0.38 to 0.60 molybdenum, up to 0.59 copper, and 0.002 to 0.017 titanium, the balance being essentially iron.

References Cited by the Examiner

UNITED STATES PATENTS

| | | | |
|---|---|---|---|
| 2,693,414 | 11/54 | Dunn et al. | 75—129 |
| 2,810,818 | 10/57 | Rathschild et al. | 219—137 |
| 2,980,529 | 4/61 | Knapp et al. | 75—57 |
| 3,055,755 | 9/62 | Schelling | 75—123 |
| 3,097,294 | 7/63 | Kurbli et al. | 219—145 |

OTHER REFERENCES

"Titanium in Steel," Comstock, Urban and Cohen, 1949, page 181.

RICHARD M. WOOD, *Primary Examiner.*